United States Patent Office 3,513,072
Patented May 19, 1970

3,513,072
INACTIVATION OF ALPHA AMYLASE ENZYMES BY FLUOROSILICATE COMPOUNDS
John Frankevicz, Bethel, and Sidney M. Short, Winthrop, Maine, assignors to Oxford Paper Company, Rumford, Maine, a corporation of Maine
No Drawing. Filed June 22, 1967, Ser. No. 653,843
Int. Cl. C12d *13/02*
U.S. Cl. 195—31      7 Claims

ABSTRACT OF THE DISCLOSURE

Alpha amylase enzymes are inactivated by fluorosilica compounds, thus, a high degree of control over starch liquification may be maintained in a starch slurry.

Background of invention

Alpha amylase enzymes are among the most useful of industrial enzymes. The greatest industrial consumption of alpha amylase enzymes occurs in the liquefaction of starch for the preparation of paper and textile sizes, starch coatings, laminating adhesives and as adhesives for the binding of pigments to web products such as paper. Alpha amylase enzymes are also used to saccharify starch for the manufacture of maltose, glucose and alcohols. In starch liquefaction processes, the alpha amylase enzymes catalyze the random hydrolyzation of the D-glycosidic linkages in the central portion of the long glucose chains in the starch molecules. In saccharification reactions, alpha amylase enzymes are used in conjunction with other enzymes, particularly other carbohydrates, the alpha amplase acting as a reaction promoter or catalyst. For example, beta amylase may be utilized in conjunction with alpha amylase for the purpose of reducing starch to maltose. Beta amylase splits off single glucose units, attacking at the non-reducing ends of both the long and short chains of the starch molecule. Consequently, a saccharification reaction utilizing only beta amylase would proceed relatively at a slow rate. Alpha amylase acts as a reaction promoter by randomly cleaving the long chains of the starch molecules near their centers, thereby substantially increasing the number of active sites at which the beta amylase may hydrolyze the starch molecules. Alpha amylase likewise finds utilization as a reaction promoter with such enzymes as maltase and amyloglucosidase for the degradation of starch into alcohols.

It is necessary in a number of industrial amylolytic processes to employ some means whereby the enzyme activity of the alpha amylase may be controlled and terminated with precision. In older methods termination of alpha amylase activity was accomplished by heating the enzyme-substrate slurry to a sufficient temperature to deneutralize or destructively inactivate the enzyme. Such methods may require temperatures in excess of 200° F. in applications utilizing high temperature resistant alpha amylase such as Amyliq Jet. Such methods are objectionable in that the heat inactivation must be initiated at a pre-determined time which is dependent upon the characteristic heat capacity of the system. Since heating times are dependent upon a number of empirical factors, accurate control over the reaction by heating methods is difficult. In addition, thermal inactivation methods are vulnerable to fluctuations or failures of the heat supply, such that a failure or loss of pressure in a steam heating method, for example, could mean the loss of an entire process batch. Using heat inactivation, particularly with steam, causes more dilution of the starch slurry than would be desirable at times.

A number of chemical enzyme inactivators have been developed to overcome the disadvantages inherent in thermal inactivation methods and to provide an accurate and rapid means of controlling enzyme reactions which may be adapted to automated methods. Representative of such chemical inactivators are copper sulfate, barium peroxide, hydrogen peroxide, silver nitrate, mercuric chloride, sodium hypochlorite and cadmium chloride. These enzyme inactivators have met with only a limited degree of success as they have a number of objectionable characteristics which are overcome by this invention.

Most notable among the disadvantages of the enzyme inactivators provided in the prior art are their toxicity and their tendency to discolor the product. Such inactivators therefore cannot be used in the processing of foodstuffs. A number of chemical inactivators are useful only in high concentration, a requirement which makes their use costly. In addition, many of the enzyme inhibitors provided in the prior art generate an excessive amount of cations which will induce flocculation when colloidal pigments are mixed with the liquefied substrate.

As an example, copper sulfate has many advantages as a chemical inactivator, the most significant being the fact that it is effective at low concentration. However, copper sulfate discolors the substrate a bright green color and renders it toxic. Barium peroxide has been used as an inactivator, but it is objectionable for many uses because of its toxic effect to humans and the fact that it produces polyvalent cations which tend to flocculate clay pigments when mixed with a converted substrate, such as starch, in the preparation of paper-coating compositions. Inactivators such as mercuric chloride, cadmium chloride and sodium hypochlorite are objectionable in that they must be used in high concentrations and as a consequence are relatively expensive to use. Hydrogen peroxide, though it has many advantages such as non-toxicity, will oxidize and hence discolor many substrates, in particular, starches.

Summary of the invention

To overcome the above disadvantages inherent in the use of the chemical inactivators and the thermal inactivation methods provided by the prior art, it is the object of this invention to provide improved chemical inactivators for alpha amylase enzymes which consist of fluorosilicate-containing compounds. Fluorosilicate inactivators have the following advantages as enzyme inactivators:

(1) They are effective at low concentrations.

(2) They will not discolor the substrate acted on by the alpha amylase enzyme.

(3) They are not toxic and hence may be used in foodstuff applications.

(4) They have a sharp threshold concentration at which enzyme inactivation occurs. Hence, fluorosilicate inactivators are particularly useful in continuous processes as a means for quickly and accurately controlling enzyme activity. A further advantage is found in batch processes wherein a residue of previously inactivated enzyme-substrate mixture is mixed with a fresh batch of enzymes and undigested substrate material without any noticeable harmful effects.

(5) The chemical inactivators provided by this invention are inexpensive, costing in the neighborhood of 15 to 18 cents a pound.

Broadly the invention encompasses a method of inactivating alpha amylase enzymes and bacterial diastase by reacting said enzymes in a suitable medium containing a sufficient concentration of fluorosilicate radicals. This invention additionally encompasses a method of terminating alpha amylase enzyme catalyzed reactions involving alpha amylase enzymes as well as additional enzymes such as carbohydrases, lipases and proteases which comprises the addition of a sufficient quantity of fluorosilicate radical to the reaction mixture to inactivate the alpha amylase.

A preferred practice of this invention finds utilization as an improved means of liquefying starch in which starch is digested in an aqueous slurry by an alpha amylase enzyme or a mixture of enzymes containing an alpha amylase enzyme or stable bacterial diastase which comprises adding a fluorosilicate-bearing compound, such as sodium fluorosilicate ($Na_2SiF_6$), in a sufficient quantity to inactivate the alpha amylase enzymes.

Alpha amylase enzymes hydrolyze the central D-glycosidic linkages of carbohydrates. Alpha amylase enzymes will produce random cleavage of starch molecules at a variety of sites in the inner portion of the starch chain by combining with the starch molecule at the cleavage site and inducing an $H^+$ ion and $OH^-$ ion into the linkage. The thusly introduced ions hydrolyze the linkage and cause cleavage. After initiating the hydrolysis reaction, the enzymes are freed from the starch molecule for further catalyzation of the hydrolyzation reaction. In this invention the fluorosilicate radical ($SiF_6^=$) is reacted with alpha amylase enzymes to form an unreactive product. Alpha amylase enzymes are available in industrial quantities in a number of varieties which are distinguished by their properties, in particular the properties related to heat resistance and the range of pH at which the enzymes are active. It is anticipated that this invention will work effectively with all varieties of alpha amylase enzymes and in particular with alpha amylase enzymes produced from the following varieties of baceteria, namely: *Aspergillus oryzage*, *Becillus subtillis*, and *Aspergillus niger*, the latter being the most widely used industrial bacteria for producing alpha amylase. It is also anticipated that the present invention will be an effective enzyme inactivator for most of the common commercial enzyme mixtures in which alpha amylase is used as a catalyst enzyme or promoter. Some of the common commercial enzyme preparations for which fluorosilicate compounds may be used as inactivators are as follows: Amizyme, Amyliq Jet, diastases, malts and malt syrups, and Mylases.

Any suitable liquid medium may be used will allow the release of fluorosilicate radicals from the inactivator compound. However, for most commercial starch liquefication processes an aqueous medium is the most economical.

The effective threshold concentration of fluorosilicate inactivator will depend upon the particular alpha amylase enzyme used. However, in experiments conducted on pure commercial alpha amylase enzymes and alpha amylase containing enzyme mixtures, the effective inactivation concentration is in the range of 0.04 to 0.08 percent fluorosilicate inactivator by weight based on the dry weight of the starch substrate. In certain applications a degree of inactivation may be accomplished at concentrations of 0.02 percent based on the dry weight of the starch substrate.

An unexpected and useful characteristic of fluorosilicate inactivators is the fact that there is a sharp threshold concentration above which the inactivation of alpha amylase enzymes is substantially complete and below which the inactivation of the alpha amylase enzymes is substantially negligible. In applications not utilizing high temperature alpha amylases, such as is proved commercially in Amyliq Jet, the threshold concentration is approximately 0.06 percent by weight based on the dry weight of the substrate starch. This characteristic may be used with advantage in batch process operations in which a residue of processed and inactivated starch slurry is retained in the kettle and mixed with a new mixture of starch and enzymes to be processed. Additionally, this sharp cut off characteristic may be used to advantage in continuous processing methods. Since the reaction of the fluorosilicate radical with the alpha amylase is substantially instantaneous, a very close control over the enzyme reaction may be effected by automatic means. More specifically, in continuous starch liquefication processes, a high degree of control over the product viscosity may be maintained by automatic metering of fluorosilicate compounds into the reaction slurry, such metering being controlled by a viscosity measuring device.

Various fluorosilicate compounds can be used to inactivate the enzymes according to this invention including alkali metal fluorosilicates such as sodium fluorosilicate (sodium silicofluoride) and ammonium fluorosilicate.

Description of the preferred embodiments

The following examples are illustrative of the effectiveness of the use of fluorosilicate compounds for the inactivation of alpha amylase enzymes in a variety of applications. The examples below, however, are not to be considered as limiting the scope of the invention.

Example I

Fifty pounds of air-dried Union Pearl starch, eighty pounds of deionized water, and two pounds of Amyliq Jet/enzyme (a high temperature alpha amylase derived from *Aspergillus niger*) were charged to a conventional cooking vessel. The charge was heated to about 174 to 177° F. by direct steam injection and held at this temperature for about 35 minutes. The steam was turned off, and 20.4 grams (0.1 percent of the oven-dried starch) of sodium fluorosilicate were added to the reaction mixture. The mixture was allowed to mix for 10 minutes and was then dumped to another vessel. The solids contained in the mixture were determined to be 34.1 percent, and the overall mixture had a viscosity of about 200 cps. The mixture was then covered and allowed to stand in a water bath for 24 hours at 75° C. A sample was taken from the mixture at this time and the solid content remained the same, 34.1 percent, and the viscosity also remained the same, about 200 cps.

Example II

Twenty-nine runs were conducted using the same method and quantities used in Example I, except that the quantity of sodium fluorosilicate inactivator was varied. The starch solids concentration was between 40.7 percent to 41.3 percent for eight of the runs, between 18.0 percent and 18.2 percent for an additional nine runs and between 31.1 percent and 32.2 percent for a final twelve runs. Each of the aqueous starch and enzyme charges was heated from 174 to 177° F. for 35 minutes. After heating, a measured quantity of sodium fluorosilicate was added to the reaction mixture and thoroughly mixed in the slurry for 10 minutes. After the 10-minute mixing period, a sample of the slurry was analyzed for reducing sugar content expressed in dextrose units. The mixture was transferred to a second vessel and allowed to stand in a water bath at 175° F. for 24 hours, after which period a second sample was taken and the reducing sugar content was analyzed. The results of the twenty-nine runs are listed below in Table I which indicates for each run the corresponding values of percentage change in reducing sugar content and sodium fluorosilicate concentration based upon the oven-dried weight of the starch.

The amount of starch conversion was measured by reducing sugar analysis rather than by viscosity measures because reducing sugar measurements are not subject to retrogradation (i.e., recombination of the digested starch chains). An additional reason for using the reducing sugar content as a measure of the enzyme activity was the difficulty in maintaining adequate temperature control for an accurate viscosity measurement. It should be noted that the reducing sugar measurements measured aldehyde content as well as dextrose content, the latter being present in negligible quantities.

A graph constructed from the data of Table I in which the changes in reducing sugar content $\Delta R.S.$ are plotted against the corresponding value of sodium fluorosilicate concentration would indicate that there is a sharp cut off concentration around 0.06 percent sodium fluorosilicate by weight oven-dried starch below which the enzyme inactivation is substantially negligible and above which the enzyme inactivation is substantially complete.

TABLE I

| Percent Na$_2$SiF$_6$ on oven dry starch | R.S.$_1$ percent | R.S.$_2$ percent | ΔR.S. | Percent solids | Remarks |
|---|---|---|---|---|---|
| .032 | 1.10 | 22.2 | 21.1 | 18.6 | |
| .097 | 1.10 | 1.8 | .7 | 18.6 | |
| .161 | 1.10 | 1.9 | .8 | 18.6 | |
| .325 | 1.10 | .94 | −.2 | 18.6 | |
| 0 | 1.10 | 22.4 | 21.3 | 18.6 | |
| .032 | 1.10 | 20.2 | 19.1 | 18.2 | |
| .066 | 1.10 | 1.4 | .3 | 18.2 | |
| .097 | 1.10 | 1.2 | .1 | 18.2 | |
| 0 | 1.10 | 21.4 | 20.3 | 18.2 | |
| .048 | 1.7 | 22.0 | 20.3 | 32.3 | |
| .063 | 1.7 | 13.1 | 11.4 | 32.3 | |
| .078 | 1.7 | 3.5 | 1.8 | 32.3 | |
| .093 | 1.7 | 2.3 | .6 | 32.3 | |
| 0 | 2.2 | 23.2 | 21.0 | 31.1 | |
| .080 | 2.2 | 1.6 | [1] −.6 | 31.1 | Retrogradation. |
| .113 | 2.2 | 1.8 | [1] −.4 | 31.1 | |
| .162 | 2.2 | 1.7 | [1] −.5 | 31.1 | |
| .016 | 1.5 | 26.3 | 24.8 | 31.1 | These four samples aged 42 hours. |
| .085 | 1.5 | 3.7 | 2.2 | 31.1 | |
| .161 | 1.5 | 1.8 | .3 | 31.1 | |
| .348 | 1.5 | too thick to analyze [1] | | 31.1 | |
| .062 | 3.92 | 17.9 | 14.0 | 40.7 | |
| .086 | 3.92 | 3.66 | −.26 | 40.7 | |
| .123 | 3.92 | 3.60 | −.32 | 40.7 | |
| 0 | 3.92 | 22.3 | 18.4 | 40.7 | |
| .012 | 4.02 | 23.2 | 19.2 | 41.3 | |
| .037 | 4.02 | 22.8 | 18.8 | 41.3 | |
| .061 | 4.02 | 20.7 | 16.7 | 41.3 | |
| .121 | 4.02 | 5.08 | 1.06 | 41.3 | |

[1] These data indicate that the starch suspension retrograded, indicating that all enzyme activity had ceased.
R.S.$_1$ = Percent reducing sugars (expressed as dextrose) immediately upon completion of cooking.
R.S.$_2$ = Percent reducing sugars (as dextrose after aging one day at 75° C.).
ΔR.S. = R.S.$_2$ − R.S.$_1$.

Example III

Eleven runs were conducted using the same materials and methods as in Example II, except that Amizyme powder (a lower temperature alpha amylase enzyme derived from *Bacillus subtillis*) was utilized instead of Amyliq Jet. The results of the eleven runs are summarized below in Table II. It should be noted that in run 7 the retrogradation of the starch produced too great a slurry viscosity for analysis of the reducing sugar content. The starch retrogradation in run 7 is indicative of the fact that all substantial enzyme activity had ceased. In Table II below, R.S.$_1$ represents the reducing sugar content measured shortly after inactivation. R.S.$_2$ represents the reducing sugar content taken 24 hours later after the slurry was allowed to remain standing at an average temperature of 75° C. ΔR.S. represents the change in reducing sugar content over the 24-hour period. The eleven runs were conducted on various solid contents in the starch slurry to detect any effect on the solid content inactivator. The results are summarized in Table II below.

TABLE II.—Na$_2$SiF$_6$ FOR INACTIVATION OF AMIZYME POWDER ENZYME

| | Percent Na$_2$SiF$_6$ on solids | R.S.$_1$, percent | R.S.$_2$, percent | ΔR.S. | Solids, percent |
|---|---|---|---|---|---|
| Runs: | | | | | |
| 1 | 0 | 2.47 | 21.2 | 18.7 | 28.1 |
| 2 | 0.03 | 1.74 | 22.6 | 20.9 | 28.1 |
| 3 | 0 | 2.65 | 21.4 | 18.8 | 27.8 |
| 4 | 0.03 | 2.99 | 20.2 | 17.2 | 27.6 |
| 5 | 0.02 | 3.06 | 19.0 | 15.9 | 27.9 |
| 6 | 0.04 | 2.58 | 15.4 | 13.3 | 27.9 |
| 7 | 0.15 | 2.89 | ([1]) | ([2]) | 30.9 |
| 8 | 0.12 | 2.89 | 3.51 | 0.6 | 30.9 |
| 9 | 0.10 | 2.89 | 3.74 | 0.9 | 30.9 |
| 10 | 0.08 | 2.89 | 4.07 | 1.2 | 30.9 |
| 11 | 0 | 2.89 | 17.8 | 14.9 | 30.9 |

[1] Semi-solid.
[2] Not analyzed (retrogradation).

Example IV

Eight runs were conducted using the same materials and method as in Example II with the exception that the ammonium fluorosilicate was used as the inactivator. Amyliq Jet enzyme was utilized as the digesting enzyme for the starch. It should be noted that in runs 5 to 8, the digested starch retrograded to such a degree that the viscosity of the slurry was too great for an analysis of the reducing sugar content. The retrogradation clearly shows that substantially all of the alpha amylase enzymes were inactivated. The results of the eight runs are summarized below in Table III.

TABLE III.—AMMONIUM SILICOFLUORIDE FOR INACTIVATION OF AMYLIQ JET ENZYME

| | Percent (NH$_4$)$_2$SiF$_6$ based on dry weight solids | R.S.$_1$, percent | R.S.$_2$, percent | ΔR.S. | Percent solids |
|---|---|---|---|---|---|
| Runs: | | | | | |
| 1 | 0.016 | 1.84 | 24.6 | 22.8 | 30.5 |
| 2 | 0.035 | 1.84 | 24.1 | 22.3 | 30.5 |
| 3 | 0.049 | 1.84 | 23.3 | 21.5 | 30.5 |
| 4 | 0.067 | 1.84 | 7.88 | 6.04 | 30.5 |
| 5 | 0.109 | 1.27 | [1] Impossible | | 30.4 |
| 6 | 0.129 | 1.27 | [1] Impossible | | 30.4 |
| 7 | 0.152 | 1.27 | [1] Impossible | | 30.4 |
| 8 | 0.172 | 1.27 | [1] Impossible | | 30.4 |

[1] These samples retrograded to a solid mass and so could not be analyzed. Therefore, it is safe to assume that the enzyme is no longer active.
R.S.$_1$ = Reducing sugars, expressed as dextrose, immediately after cooking.
R.S.$_2$ = Reducing sugars, expressed as dextrose, immediately after aging at 75° C. overnight.
ΔR.S. = R.S.$_2$ − R.S.$_1$.

Example V

The following example illustrates the fact that fluorosilicate compounds will have substantially no inactivating effect on alpha amylase enzymes below a characteristic threshold concentration. In the ten runs summarized below in Table IV, the quantity of silicofluoride was varied. The Brookfield viscosity of each run was measured one hour after inactivation, and the reducing sugar content measurements were taken after one hour (indicated as R.S.$_1$) and after twenty-four hours (indicated as R.S.$_2$). In runs 1 to 6, Amizyme powder was used; in runs 7 to 10, Amyliq Jet enzyme was utilized.

TABLE IV.—CONVERSION WITH AMIZYME POWDER IN THE PRESENCE OF SMALL AMOUNTS OF Na$_2$SiF$_6$

| | Na$_2$SiF$_6$,[a] percent | Solids, percent | Brookfield,[b] cps. | R.S.$_1$,[c] percent | R.S.$_2$,[d] percent | Enzyme |
|---|---|---|---|---|---|---|
| Runs: | | | | | | |
| 1 | 0 | 28.1 | 194 | 2.47 | 21.2 | Amizyme. |
| 2 | 0.03 | 28.1 | 670 | 1.74 | 22.6 | Do. |
| 3 | 0 | 27.8 | 205 | 2.65 | 21.4 | Do. |
| 4 | 0.03 | 27.6 | 195 | 2.99 | 20.2 | Do. |
| 5 | 0.02 | 27.9 | 262 | 3.06 | 19.0 | Do. |
| 6 | 0.04 | 27.9 | 123 | 2.97 | 15.9 | Do. |
| 7 | 0 | 28.4 | 656 | 3.09 | 21.6 | Amyliq Jet. |
| 8 | 0.04 | 27.9 | 518 | 2.60 | 17.8 | Do. |
| 9 | 0.04 | 27.2 | 1410 | 1.91 | 8.86 | Do. |
| 10 | 0 | 28.1 | 5070 | 2.67 | 22.4 | Do. |

[a] Percent sodium fluorosilicate on open dry starch.
[b] Brookfield viscosity on a killed sample, one hour after cooking, at 60° C. and 100 r.p.m.
[c] R.S.$_1$ = percent reducing sugars immediately after cooking.
[d] R.S.$_2$ = percent reducing sugars after aging 24 hours at 75° C.

We claim:

1. A method of inactivating alpha amylase enzymes and stable bacterial diastase which comprises reacting said enzyme in a suitable medium with a sufficient quantity of fluorosilicate radical, thereby rendering said enzymes incapable of hydrolyzing the D-glycosidic linkages of carbohydrates.

2. A method of terminating a reaction in which D-glycosidic linkages are hydrolyzed by alpha amylase enzymes in a liquid medium containing at least alpha amylase enzymes and a carbohydrate substrate acted upon by said alpha amylase enzymes, which comprises adding a sufficient quantity of fluorosilicate radical to the liquid medium so that the fluorosilicate will render the alpha amylase enzymes incapable of hydrolyzing the D-glycosidic linkage in said carbohydrate substrate.

3. The method according to claim 2 in which the carbohydrate substrate is a starch.

4. A method according to claim 2 in which the liquid medium is water.

5. The method according to claim 4 in which the hydrolysis reaction is promoted by the hydrolysis of D-glycosidic linkages by alpha amylase enzymes and the carbohydrate substrate is a starch.

6. In the hydrolyzation of a starch with alpha amylase enzymes in a liquid medium, the improvement in combination therewith which comprises terminating the enzyme reaction by adding a sufficient quantity of a fluorosilicate bearing compound which is soluble in said liquid medium, thereby rendering the alpha amylase enzymes incapable of hydrolyzing the starch.

7. A method according to claim 6 in which starch is slurred in an aqueous medium with a sufficient quantity of alpha amylase enzyme and said fluorosilicate compound is selected from the group consisting of bisodium fluorosilicate and ammonium fluorosilicate.

References Cited

J. A. Radley: Starch and Its Derivatives, Jan. 9, 1969, pp. 440–445.

LIONEL M. SHAPIRO, Primary Examiner

G. M. NATH, Assistant Examiner

U.S. Cl. X.R.

195—117